June 30, 1931. J. A. SMITH 1,812,416
AWNING SUPPORT AND PROTECTOR
Original Filed Dec. 17, 1928
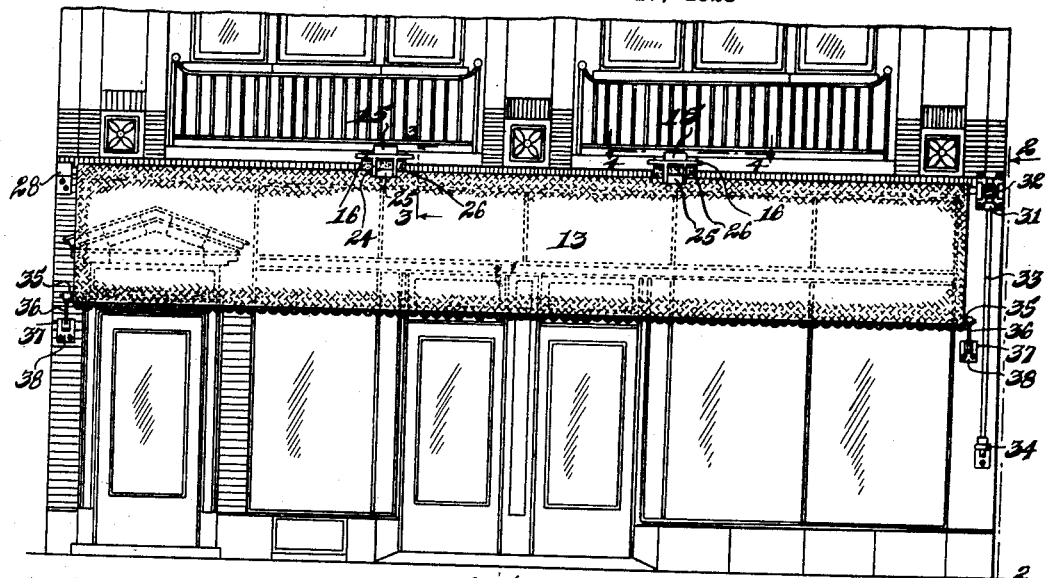
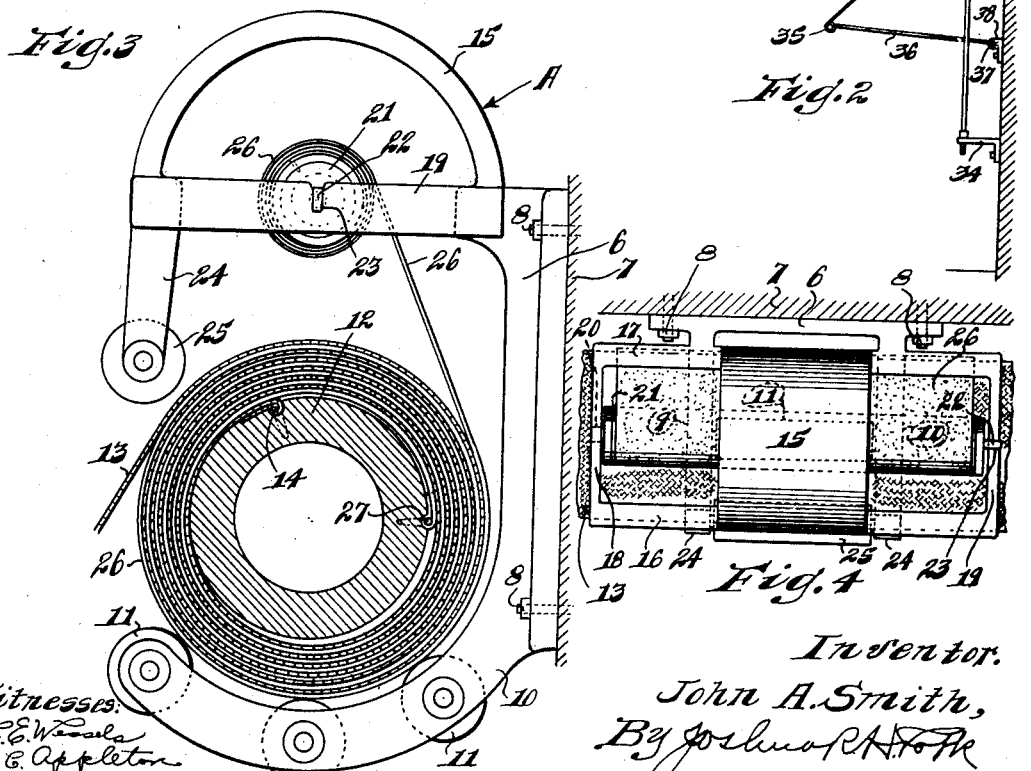
Inventor.
John A. Smith,
By Joshua R. H. Potts
his Attorney.

Patented June 30, 1931

1,812,416

UNITED STATES PATENT OFFICE

JOHN A. SMITH, OF CHICAGO, ILLINOIS

AWNING SUPPORT AND PROTECTOR

Application filed December 17, 1928, Serial No. 326,468. Renewed November 21, 1930.

This invention relates to awning supports and protectors, having for its object the provision of a novel awning center support providing means for interposing a protecting strip between the awning and the rollers of the center support, thereby preventing the ripping and fraying of the awning at those points which in practice have been found most subject to wear and tear.

Another object is to provide a novel awning support having as a part thereof a separate smaller roller on which a protecting strip forming a particular feature of my invention, is wound for interleaving with the awning.

Other objects will appear hereinafter.

The invention consists in the construction, combination and arrangement of parts hereinafter set forth, reference being had to the accompanying drawings in which Fig. 1 is a front elevation of an edifice showing an awning to which my invention has been operatively applied;

Fig. 2 is an elevational view taken on line 2—2 of Fig. 1, looking in the direction of the arrows;

Fig. 3 is an enlarged sectional view, taken on line 3—3 of Fig. 1, looking in the direction of the arrows, and Fig. 4 is a top plan view of the novel awning roller and protecting strip, taken on line 4—4 of Fig. 1.

In the drawings, A designates the combination awning center support and protecting strip support, the device comprising a plate 6 secured to a wall 7 in any suitable manner as by the bolts and nuts 8. Formed integrally with the plate 6 are the lower projecting curved yoke arms 9, 10 which are provided with rollers 11 revolvably secured therein.

Turnably supported on the rollers 11 is a drum or spool 12 on which the awning 13 is wound, being suitably secured in a slot therein by a key 14. On the upper portion of the plate 6 and also formed integral therewith is an arcuate member 15 provided with U-shaped members 16, 17 having transverse bars 18, 19. The bar 18 has a hole serving as a socket for the pivot pin 20 on a smaller spring actuated spool 21. The other of the supporting pins 22 is provided with a flattened end secured in a notch 23 of the transverse bar 19. The U-shaped members 16, 17, have downwardly projecting members 24, 24 on the ends of which the rollers 25 are journalled, the latter serving to restrain the spool and awning thereon in the position shown in Fig. 3. A protecting strip 26 is secured to the spring actuated drum or spool 21 and also to the drum 12 by key 27 in another slot in the spool or drum 12. As shown in Fig. 1, the awning spool or drum 12 is revolvably supported at one end in a bracket 28 fastened to the supporting wall, and at the other end to a gear 29 revolvably mounted on a lug 30 in the bracket 31, the gear 29 coacting with a worm 32 fastened to the rod 33 which is turnably secured and maintained in operative vertical position in the bracket 31. The rod 33 has a collar fastened thereto which seats on another bracket 34. The lower square end of rod 33 is received in a socket handle member (not shown), when it is desired to raise and lower the awning.

The function and general manner of operating the device has been in a large measure indicated by the details set forth above but will be more fully apparent in the following brief description:

The awning 13 which, as shown in Fig. 1, is a fabric of rather heavy dense structure and of considerable weight is wound on the drum 12, one end of which is connected to the gear element 29 meshing with the worm 32, as set forth above. When it is desired to raise or lower the awning, the rod 33 will be turned thereby actuating the worm 32 and gear 29 and consequently raising and lowering the awning. By reason of the weight of the awning it has been found that where the latter engages the rollers 11, in a comparatively short space of time, wrinkling and fraying occurs, this being rapidly followed by the ripping and disintegration of the awning at this point. I have found that it is possible to protect the awning from the destructive action of the rollers 11 by interposing between the awning and the rollers, a strip of fabric in the manner indicated in the drawings, it being observed that while the awning is being wound on the roller, the fabric strip 26 will be interleaved therewith,—the strip directly engaging the rollers 11 and not the awning. The fabric, it will be observed, is maintained under suitable tension by means of the spring actuated rollers 21, there being a plurality of these if the awning is of sufficient size and weight to require more than one supporting roller. In the form illustrated in Fig. 1, two supporting rollers and protectors are used. As shown in Fig. 2, the awning is provided with a roll 35 which is connected to a brace rod 36 pivoted at 37 to a bracket 38 secured to the supporting wall.

Since awnings, such as are required for commercial establishments, are comparatively costly, and since, as pointed out, they are subject to rapid deterioration by reason of the roller supports which are essential for the convenient manipulation of the awnings, it will be seen that the comparatively simple and inexpensive means I have provided will serve to minimize and practically prevent undue wear and tear of the awning at those points, which as pointed out have been most subject to destruction.

While I have described to some degree of particularity a preferred form of the invention, it will be understood that the device may be modified without departing from the spirit or sacrificing any of the advantages of the construction. I do not desire therefore to be confined to the precise details of construction, save to the extent these are circumscribed within the scope of the appended claims.

Having described my invention, what I claim as new and desire to secure by Letters Patent is:

1. In combination an awning supporting structure and coacting awning protecting means, said awning protecting means comprising a strip of material mounted on said structure and interwound with an awning sustained on said supporting structure.

2. An awning center support comprising, in combination, a supporting frame, an awning drum with an awning secured thereto mounted for rotation upon said frame, a protecting strip carried by a roller, said protecting strip adapted to engage and be interleaved with said awning.

3. An awning center support comprising, in combination, a supporting frame, a spring actuated roller mounted upon said frame, a strip of protecting material wound upon said roller, a drum mounted for rotation upon said frame, and an awning wound upon said drum, said protecting strip adapted to be wound and unwound upon said drum in interleaved contact with said awning.

4. An awning center support comprising, in combination, a supporting frame, rollers rotatably mounted upon said frame, a drum adapted to be rotated upon said rollers and carrying an awning windably mounted thereon, and a spring actuated spool carrying a strip of protective material adapted to be interleaved with said awning and also adapted to be interposed between said awning and said rollers during the winding and unwinding of said drum.

5. An awning center support comprising, in combination, a drum provided with an awning wound thereon, and a spool having a strip of protective material wound thereon, said strip of protective material being fastened at one end to said drum and to the opposite end to said spool whereby said protective material is continuously interleaved with said awning during winding and unwinding operations.

6. An awning center support comprising, in combination, a supporting frame, a spring actuated roller, rotatably mounted upon said frame, a plurality of supporting rollers mounted upon said frame, a drum having an awning secured thereto and adapted to be wound thereon, mounted for rotation upon said supporting rollers, and a strip of protective material secured at one end to said spring actuated roller and at the opposite end to said drum, whereby upon rotation of said drum said protective material will be wound or unwound with the awning mounted thereon.

7. An awning center support comprising, in combination, a supporting frame, a spring actuated roller, rotatably mounted upon said frame, a plurality of supporting rollers mounted upon said frame, a drum having an awning secured thereto and adapted to be wound thereon mounted for rotation upon said supporting rollers, and a strip of protective material secured at one end to said spring actuated roller and at the opposite end to said drum, whereby upon rotation of said drum said protective material will be wound or unwound with the awning mounted thereon, and whereby said protective strip will be interposed between said awning and said supporting rollers.

In testimony whereof I have signed my name to this specification.

JOHN A. SMITH.